United States Patent
Haga et al.

(10) Patent No.: US 6,507,603 B1
(45) Date of Patent: Jan. 14, 2003

(54) CDMA RECEIVER

(75) Inventors: Yoshinobu Haga, Kawasaki (JP); Takushi Mikami, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/348,938

(22) Filed: Jul. 7, 1999

(30) Foreign Application Priority Data

Sep. 7, 1998 (JP) .......................................... 10-252687

(51) Int. Cl.[7] .............................................. H04B 1/707
(52) U.S. Cl. ........................ 375/147; 375/152; 370/342
(58) Field of Search ............................... 375/147, 150, 375/152, 355; 370/335, 342

(56) References Cited

U.S. PATENT DOCUMENTS

| | | | |
|---|---|---|---|
| 5,504,776 A | | 4/1996 | Yamaura et al. |
| 5,910,948 A | * | 6/1999 | Shou et al. ............... 370/335 |
| 5,982,763 A | * | 11/1999 | Sato ............................ 370/342 |
| 6,148,044 A | * | 11/2000 | Ono et al. .................. 375/343 |

FOREIGN PATENT DOCUMENTS

EP  0 874 471  10/1998

* cited by examiner

Primary Examiner—Temesghen Ghebretinsae
(74) Attorney, Agent, or Firm—Katten Muchin Zavis Rosenman

(57) ABSTRACT

In a CDMA receiver for receiving a signal containing data that has been spread by a predetermined spreading code sequence, calculating a correlation value between a reference code sequence and a spread data sequence obtained by sampling the received signal at a predetermined sampling rate, and adopting, as despread start timing, the timing at which the correlation value is maximized, a reception-state detector detects the state of reception, a sampling controller decides sampling rate in conformity with the state of reception, a correlator calculates a correlation between a reference code sequence and a spread data sequence, which is obtained by sampling a received signal at the above-mentioned sampling rate, and a timing detector obtains the despread start timing at which the correlation value is maximized.

9 Claims, 17 Drawing Sheets

CDMA RECEIVER

BACKGROUND OF THE INVENTION

This invention relates to a CDMA receiver and, more particularly, to a CDMA receiver for receiving a signal containing data that has been spread by a predetermined spreading code sequence, calculating a correlation value between a reference code sequence and a spread data sequence obtained by sampling the received signal at a predetermined sampling rate, and adopting, as despread start timing, the timing at which the correlation value is maximized.

Competition to develop ever smaller terminals in the field of modern mobile communications is intense and there is a need to reduce the power consumed by these terminals.

Digital cellular wireless communication systems using DS-CDMA (Direct-Sequence Code Division Multiple-Access) technology have been developed as next-generation mobile communication systems for implementing wireless multimedia communication. In a CDMA digital cellular wireless communications system of this kind, a base station transmits control information and user information upon multiplexing the information with a spreading code. Individual mobile stations receive the control information from the base station, spread the transmission information using a spreading code specified by the base station and then send the information. By accepting this control information, each mobile station is capable of performing a variety of control operations. For example, the mobile station performs position registration and acquisition of information concerning base stations in the area and carries out control for call origination and incomingcall standby. In order for a mobile station to receive control information from the base station in a CDMA digital cellular wireless communications system of this kind, it is necessary to identify the start timing (phase) of spread data that has undergone spread-spectrum modulation.

FIG. 13 is a diagram showing the construction of a CDMA transmitter in a base station device which sends transmission data of control and user channels upon code-multiplexing the data. The transmitter includes spread-spectrum modulators $11_1$–$11_n$ of respective control/user channels, each having a frame generator 21, a serial/parallel (S/P) converter 22 for converting frame data to parallel data, and a spreading circuit 23. The frame generator 21 includes a transmission data generator 21a for generating serial transmission data $D_1$, a pilot signal generator 21b for generating a pilot signal P, and a framing circuit 21c for forming the serial data $D_1$ into blocks a prescribed number of bits at a time and inserting the pilot signal P before and after every block to thereby form frames. The pilot signal, when all "1"s, for example, allows the receiver to recognize the amount of phase rotation caused by transmission so that the data may be subjected to a phase rotation of an equivalent amount in the opposite direction.

The S/P converter 22 alternately distributes the frame data (the pilot signals and transmission data) one bit at a time to convert the frame data to I-component (in-phase component) data $D_I$ and Q-component (quadrature-component) data $D_Q$.

The spreading circuit 23 includes a pn sequence generator 23a for generating a pn sequence (long code) specific to the base station, an orthogonal Gold code generator 23b for generating an orthogonal Gold code (short code) specific to the control channel and user channel, an EX-OR gate 23c for outputting a spreading code $C_1$ by taking the exclusive-OR between the long code and the short code, and EX-OR gates 23d, 23e for performing spread-spectrum modulation by taking the exclusive-ORs between the data $D_I$ and $D_Q$ (symbols) respectively, and the spreading code $C_1$. It should be noted that since "1" is level −1 and "0" is level +1, the exclusive-OR between signals is the same as the product between them.

Also shown in FIG. 13 are a combiner 12i for outputting an I-component code-multiplexed signal $\Sigma V_I$ by combining the I-component spread-spectrum modulated signals $V_I$ output by the respective spread-spectrum modulators $11_1$–$11_n$ of the user channel; a combiner 12q for outputting a Q-component code-multiplexed signal $\Sigma V_Q$ by combining the Q-component spread-spectrum modulated signals $V_Q$ output by the respective spread-spectrum modulators $11_1$–$11_n$; FIR-type chip shaping filters 13i, 13q for limiting the bandwidths of the code-multiplexed signals $\Sigma V_I$, $\Sigma V_Q$, respectively; DA converters 14i, 14q for converting the analog outputs of the respective filters 13i, 13q to analog signals; a quadrature modulator 15 for applying quadrature phase-shift keying (QPSK) modulation to the code-multiplexed signals $\Sigma V_I$, $\Sigma V_Q$ of the I and Q components and outputting the modulated signal; a transmitting circuit 16 for converting the output signal frequency of the quadrature modulator to a radio frequency, applying high-frequency amplification and then outputting the signal, and an antenna 17.

FIG. 14 is a diagram illustrating the construction of the receiver of a mobile station. The receiver includes an antenna 21; a receiver circuit 22 for performing amplification and frequency conversion from RF (radio frequency) to IF (intermediate frequency); a QPSK detector 23 for performing QPSK detection and outputting I, Q signals; an AD converter 24 for converting baseband analog I, Q signals, which are the detector outputs, to digital I, Q data, respectively; a despreading circuit 25 for performing despreading by multiplying the I, Q data by a spreading code sequence identical with that of the base station; a data demodulator 26 for performing synchronous detection, data discrimination and error correction; and a searcher 27.

The searcher 27 has a matched filter 31 for performing correlation, a timing identification unit 32 for identifying spread start timing (phase), and a code table 33 for generating a reference code sequence. The matched filter 31 performs a correlation operation between a received spread data sequence and the reference code sequence in order to identify the despread start timing. The timing identification unit 32 acquires the spread start timing (phase) based upon the timing at which a correlation value between the received spread data sequence and the reference code sequence exceeds a set level.

FIG. 15 is a diagram useful in describing the structure of the matched filter and a method of specifying despread timing. The matched filter 31 includes an (n+1)-chip shift register ($s_0$–$s_n$) 31a for successively shifting a spread data sequence of the baseband at the chip frequency $f_c$; an (n+1)-chip shift register ($c_0$–$c_n$) 31b for storing the spreading code sequence, which is the reference code sequence, at the chip frequency; (n+1)-number of multipliers ($MP_0$–$MP_n$) 31c for multiplying corresponding bits of the baseband spread data sequence and reference code sequence; and an adder circuit 31d for adding the outputs of the multipliers.

When the correlation between the received spread data sequence and reference code sequence is calculated by the matched filter (MF) 31, the correlation value becomes large at the moment the spread data sequence and reference code sequence coincide. Accordingly, the timing identification unit 32 monitors the correlation value output by the matched filter 31, identifies the moment the correlation value exceeds the set level as being the despread start timing and outputs a signal indicative of this.

The foregoing relates to a case where the input to the shift register 31a is a spread data sequence obtained by sampling the output signal of the quadrature detector 23 (FIG. 14) at the chip frequency $f_c$ and converting this analog signal to digital data. A single correlation value is obtained per chip. However, if the sampling frequency is made high, a plurality of correlation values can be obtained per chip. FIG. 16 is a diagram for describing the results of simulation indicating the relationship between number of oversamplings and correlation-value output. FIG. 16 shows the correlation-value output of the matched filter at the time of eight oversamplings whose sampling frequency is equal to $8 \times f_c$. The simulation conditions are as follows:

(1) spreading code: M sequence ($x^{18}+x^7+1$)
(2) spreading rate: 16
(3) number of matched-filter taps: 256
(4) roll-off characteristic: substituted by sine curve It is evident from this correlation-value output characteristic of the matched filter that eight correlation values can be obtained per chip by eight oversamplings. For example, assume that the correlation-value output when the location on the eye pattern having the largest opening is sampled is 1. The output declines by about 0.5 dB when the offset is 1/8 chip and by about 3 dB when the offset is 2/8 chip. There is no correlation value output when the offset is 4/8 chip.

(1) If the sampling frequency is made n times the chip frequency, i.e., if there are n oversamplings, correlation values can be obtained at phase intervals of 1/n chip. Accordingly, in comparison with a case in which the sampling frequency is equal to the chip frequency, the timing at which the correlation value is maximized, namely the despread timing, can be obtained at a phase precision that is n times greater.

(2) It will be understood from the correlation-value output characteristic of the matched filter that a correlation output is not obtained unless the timing of the correlation calculation of the matched filter is shifted from the normal timing by ±1/2 chip or more, and that the correlation output becomes small if the phase difference takes on a large value, even if the shift (phase difference) is less than 1/2 chip.

FIG. 17 is graph showing the relationship between the receiving line quality (C/N ratio) and BER (Bit Error Rate) in a case where the number n of oversamplings is 4, 8, 16. Numeral 1 in FIG. 17 denotes a BER–C/N ratio characteristic at the time of four oversamplings (n=4), 2 a BER–C/N ratio characteristic at the time of eight oversamplings, and 3 a BER–C/N ratio characteristic at the time of 16 oversamplings. The larger the number of oversamplings, the smaller the BER for the same C/N ratio. Accordingly, it will be understood that even in a case where the state of reception is poor, the BER can be made small if the number of oversamplings is increased.

In a case where despreading is performed, a despread output will not be obtained if the despread timing is shifted by one chip. The larger the phase shift, the smaller the despread output. In particular, if the reception level is low, the influence of the phase shift is large and the bit error increases owing to the phase difference. In the prior art, therefore, the sampling rate of the matched filter is raised to improve the precision with which the despread start timing is detected.

However, as shown in FIG. 15, the matched filter comprises the two shift registers 31a, 31b for the baseband spread data and reference code sequence, respectively, the multiplier circuit 31c for multiplying the baseband spread data and reference code sequence, and the adder circuit 31d for adding the outputs of the multipliers. Furthermore, the A/D converter 24 (FIG. 14) is connected to the matched filter 31. When these components are included, the circuitry becomes extremely large in scale, and the higher the operating frequency, the greater the power consumed. Thus, achieving a low power consumption is difficult. As a consequence, the conventional CDMA receiver, in which the sampling rate of the matched filter is made high, consumes a large amount of power. This is problem that needs to be solved.

SUMMARY OF THE INVENTION

Accordingly, an object of the present invention is to provide a CDMA receiver in which power consumption can be reduced and which is capable of maintaining the precision with which despread timing is detected.

In accordance with the present invention, the foregoing object is attained by providing a CDMA receiver comprising a reception-state detector for detecting state of reception, a sampling controller for deciding sampling rate in conformity with the state of reception, a correlator (matched filter) for calculating a correlation between a reference code sequence and a spread data sequence, which is obtained by sampling a received signal at the above-mentioned sampling rate, and a timing detector for obtaining a timing at which the correlation value is maximized and adopting this timing as despread start timing. More specifically, if the state of reception is good, the number of oversamplings is reduced and the operating speed of the matched filter is lowered, thereby making it possible to reduce power consumption. If the state of reception is poor, the number of oversamplings is enlarged to improve the precision with which despread timing is detected.

Examples of detectors that can be used as the reception-state detector for detecting the state of reception are (1) a field-strength detector for detecting the electric field strength of a received signal, (2) an AGC control-voltage detector for detecting the control voltage of an AGC circuit, (3) a power detector for detecting signal power after despreading is performed, (4) a SIR detector for detecting the SIR (Signal Interference ratio) after despreading is performed and (5) a bit error-rate detector for detecting the bit error rate of a received code.

At the initial stage of control, sampling rate is controlled in dependence upon the reception field strength or AGC control voltage and then sampling rate is controlled in dependence upon despread-signal power or SIR, or sampling rate is controlled further in dependence upon bit error rate. If this arrangement is adopted, the sampling rate of a matched filter can be controlled from an early stage at which channel estimation has not yet been made, such as at the time of initial synchronization, the time needed for the sampling rate to converge to the optimum rate can be shortened and power consumption of the CDMA receiver can be reduced.

Other features and advantages of the present invention will be apparent from the following description taken in conjunction with the accompanying drawings.

DESCRIPTION OF THE PREFERRED EMBODIMENTS (a) First embodiment

Figure 1:
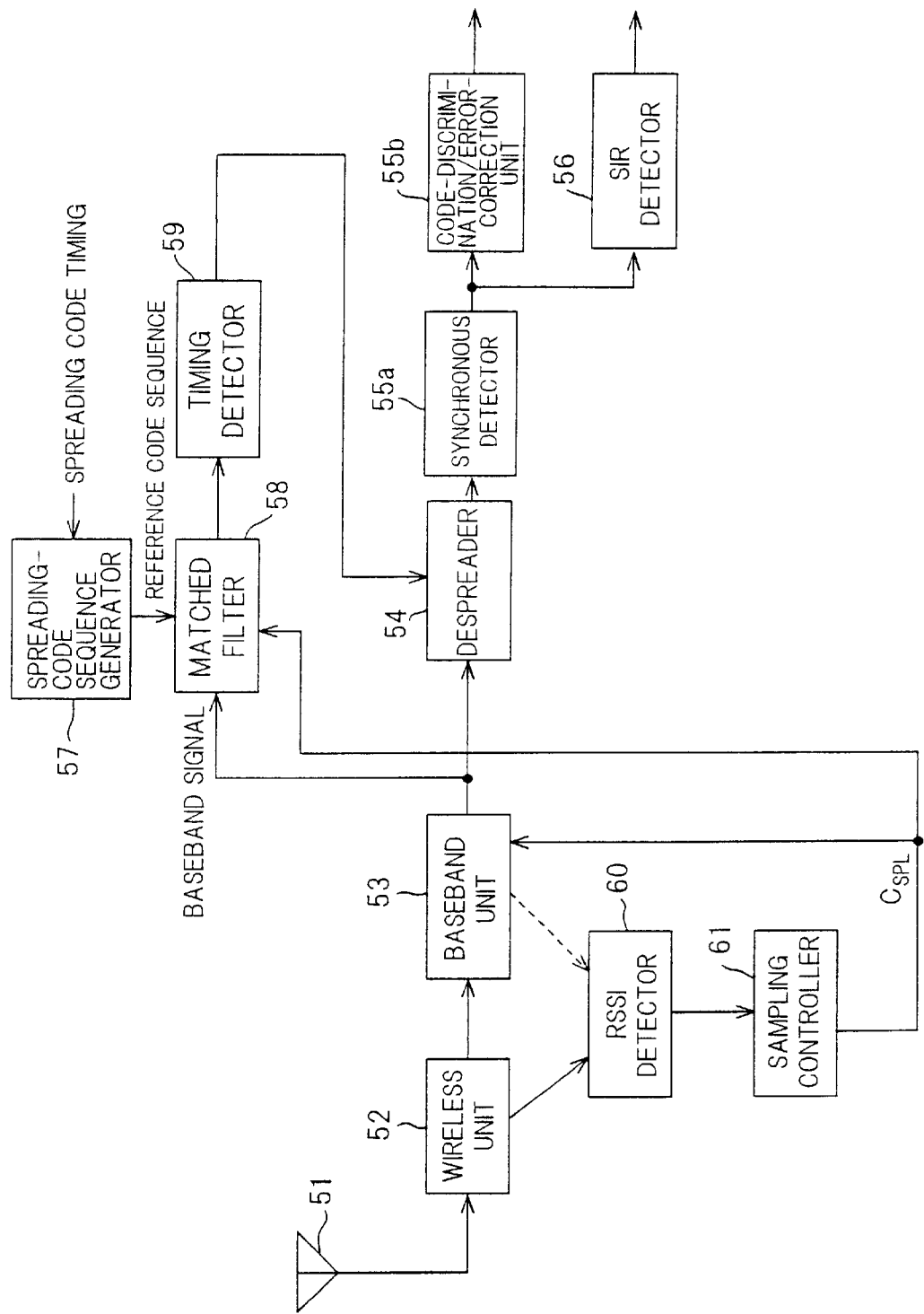
FIG. 1 is a block diagram showing a first embodiment of a CDMA receiver according to the present invention.

FIG. 1 is a block diagram showing a first embodiment of a CDMA receiver according to the present invention. According to this embodiment, reception field strength is detected and the number of oversamplings of a matched filter is controlled in conformity with the detected value.

As shown in FIG. 1, the CDMA receiver includes an antenna 51, a wireless unit 52 for subjecting the signal received by the antenna 51 to high-frequency amplification and for effecting a conversion from radio frequency to intermediate frequency, and a baseband unit 53 for performing QPSK quadrature detection to output analog I, Q signals, converting the analog I, Q signals to digital I, Q data and outputting this data. An AD converter (described later) in the baseband unit 53 samples the analog I, Q signals at an oversampling rate that is $2^n$ times the chip rate, converts these analog signals to digital data and outputs the digital received spread data sequence of the baseband.

The CDMA receiver further includes a despreading circuit 54 for performing despreading by multiplying the I, Q data, which is output by the baseband unit 53, by a spreading code sequence generated using a spreading code identical with that of the base station, a synchronous detector 55a for performing synchronous detection, a code-discrimination/ error-correction unit 55b for performing data discrimination and error correction, a SIR (Signal Interference Ratio) detector 56 for detecting and outputting SIR, and a spreading-code sequence generator 57 for generating a reference code sequence at a predetermined spreading code timing.

The CDMA receiver further includes a matched filter (correlator) 58 the input to which is the received spread data sequence of the baseband that has been converted to the digital data at the oversampling rate that is $2^n$ times the chip rate. The matched filter 58 calculates and outputs the correlation value between the received spread data sequence and the reference code sequence. The CDMA receiver further includes a timing detector 59 for detecting the timing at which the correlation value output from the matched filter 58 is largest. This timing is adopted as at which despreading starts.

Also included is an RSSI detector 60 for detecting the RSSI (Receive Signal Strength Indication). The RSSI detector 60 detects the RSSI from the output of an intermediate-frequency amplifier in the wireless unit 52 or from the detection output of the baseband unit 53. A sampling controller 61 controls the sampling frequency (number n of oversamplings) of the matched filter 58 based upon the acceptability of the state of reception, namely the reception field strength, and generates a clock signal CSPL having the above-mentioned frequency. The number n of oversamplings means that the sampling frequency is n times the chip frequency.

Figure 2:
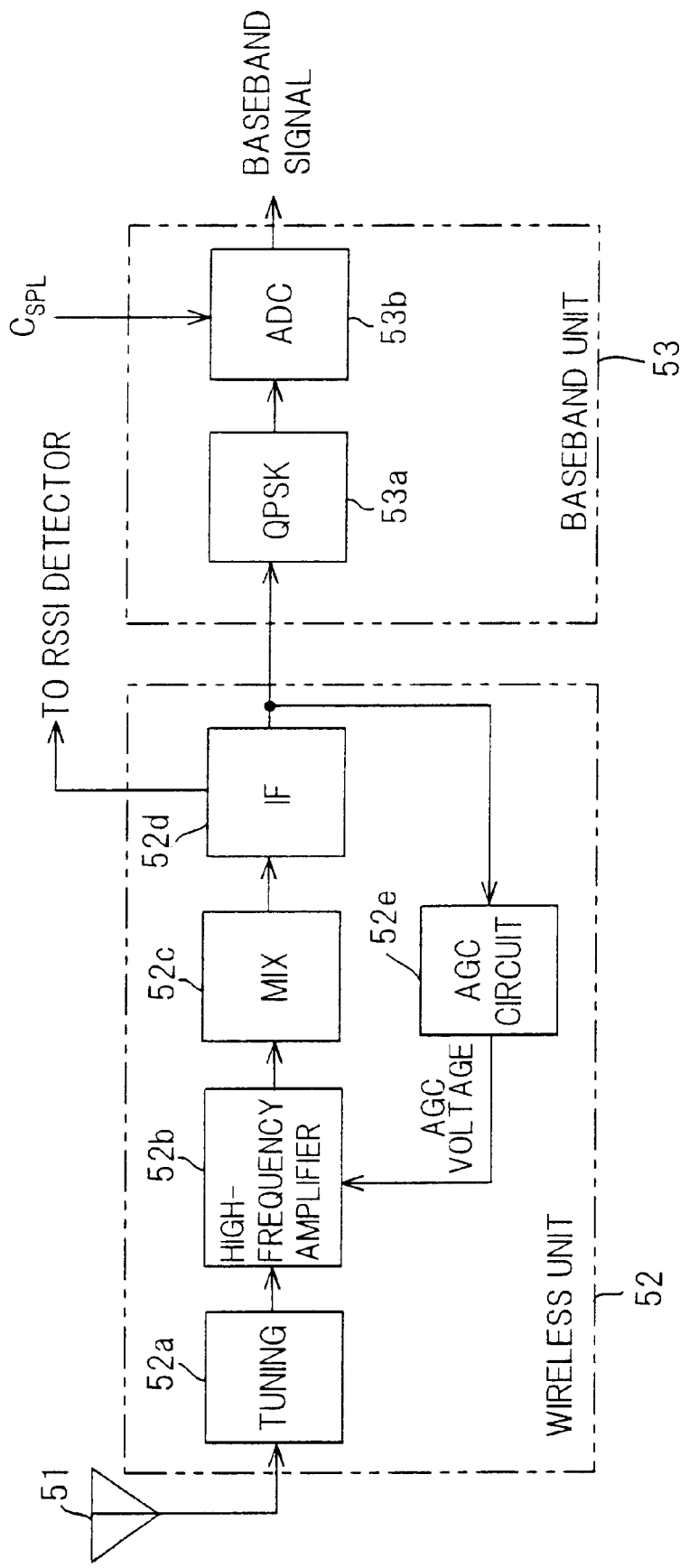
FIG. 2 is a block diagram showing the construction of a wireless unit and baseband unit.

FIG. 2 is a block diagram showing the construction of the wireless unit and baseband unit. The wireless unit 52 includes an antenna tuner 52a, a high-frequency multiplier 52b, a frequency converter 52c for converting an RF signal to an IF signal, an IF amplifier 52d and an AGC circuit 52e for controlling the gain of the high-frequency amplifier 52b based upon the IF output level, whereby control is carried out in such a manner that the IF output will become a fixed value. The RSSI detector (FIG. 1) detects the RSSI from the output of the amplifier 52d. The baseband unit 53 includes a QPSK quadrature detector 53a for performing QPSK quadrature detection to output I, Q signals, and an AD converter 53b for converting the analog I, Q signals to digital I, Q data (the spread data sequence of the baseband) based upon the clock signal $C_{SPL}$ of a prescribed sampling frequency output by the sampling controller 61. The AD converter 53b outputs the I, Q data.

Figure 3:
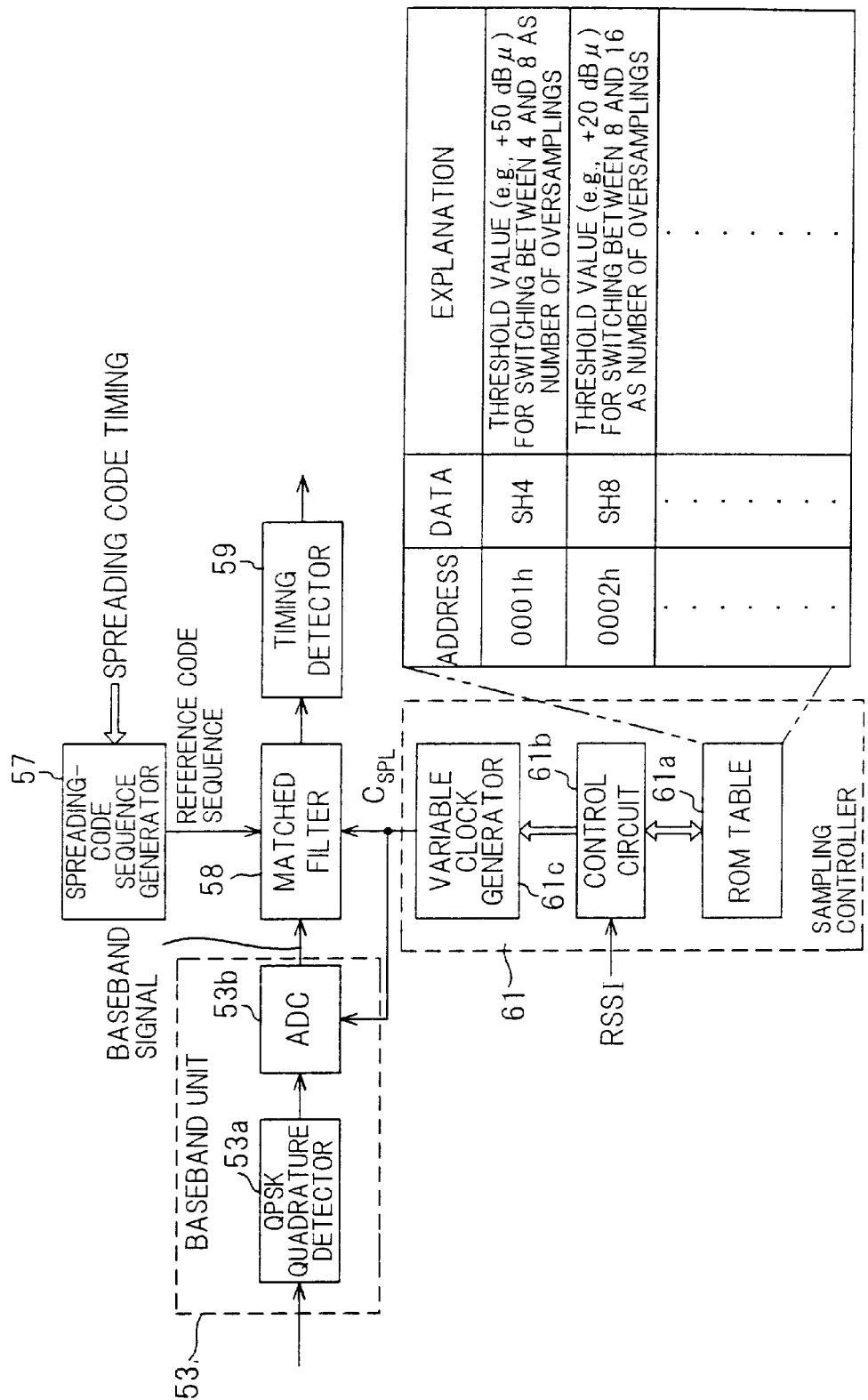
FIG. 3 is a diagram showing an example of the construction of peripheral circuitry of a sampling controller.

FIG. 3 is a diagram showing the construction of circuits peripheral to the sampling controller 61. Components in FIG. 3 identical with those shown in FIGS. 1 and 2 are designated by like reference characters. The sampling controller 61 has a ROM table 61a in which have been written beforehand oversampling numbers of the matched filter 58 that are optimum for detected RSSI values. For example, (1) 50 dBμ has been stored as a first threshold value SH4 of reception field strength to change the number of oversamplings from $2^2$ (=4) to $2^3$ (=8) or from 8 to 4, and (2) 20 dBμ has been stored as a second threshold value SH8 of reception field strength to change the number of oversamplings from $2^3$ (=8) to $2^4$ (=16) or from 16 to 8. The sampling controller 61 further includes a control circuit 61b for deciding the number of oversamplings (the oversampling frequency) based upon the RSSI value, and a variable clock generator 61c for generating the clock signal $CS_{PL}$ of a sampling frequency that conforms to the number of oversamplings decided. The output clock of the variable clock generator 61c and the spreading code timing that enters the spreading-code sequence generator 57 are synchronously controlled.

Figure 4:
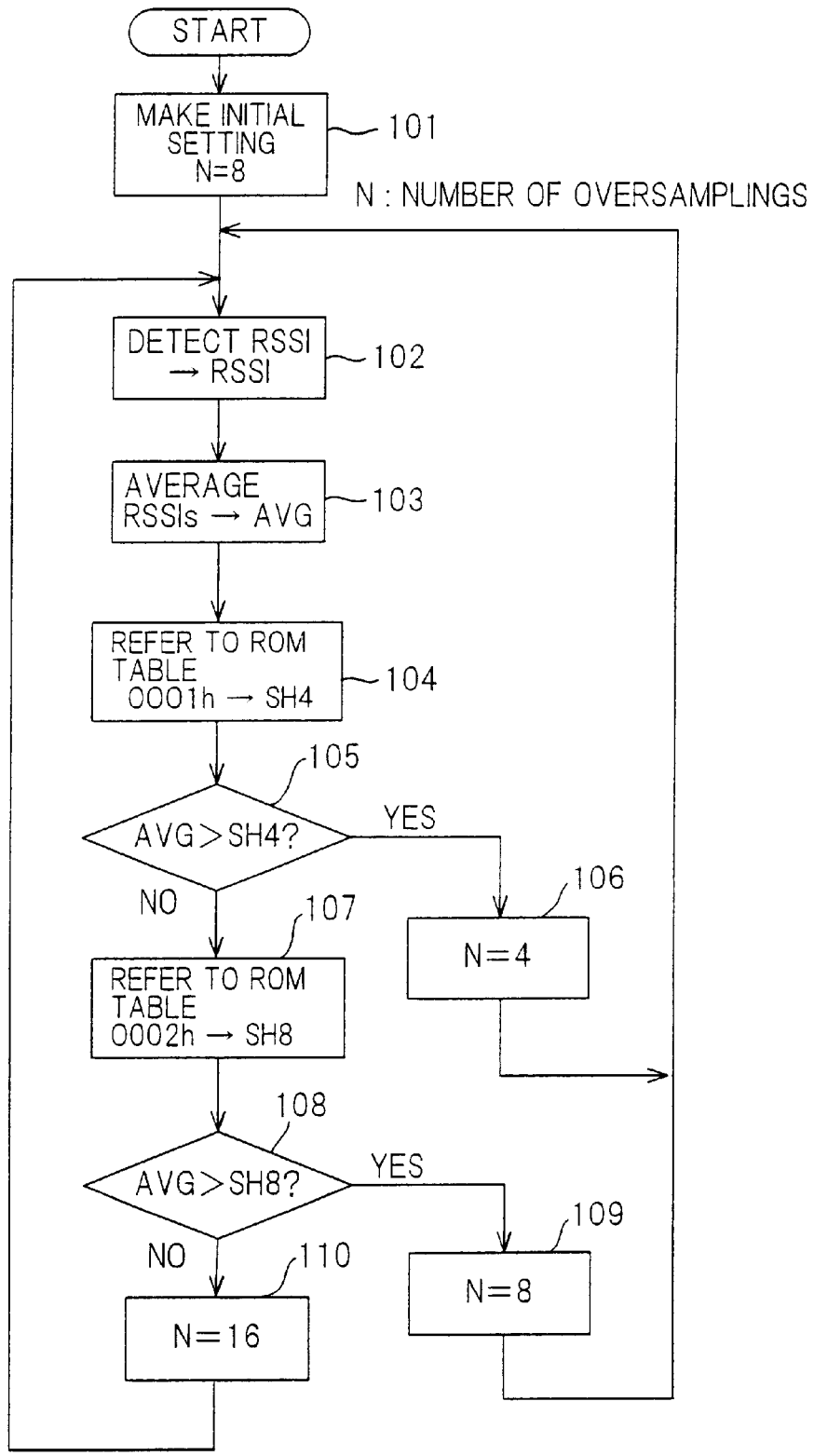
FIG. 4 is a flowchart of processing for deciding number of oversamplings.

FIG. 4 is a flowchart of processing executed by the control circuit 61b of the sampling controller 61 to decide the number of oversamplings. This is a case in which the number of oversamplings is switched among 4, 8 and 16 in dependence upon the reception field strength.

When the CDMA receiver is activated, the number N of oversamplings is set initially to 8 (step 101). The control circuit 61b then accepts RSSI values from the RSSI detector 60 at predetermined time intervals (step 102), calculates the average value AVG of these values and stores it (step 103). After calculating the average value, the control circuit refers to the ROM table 61a, reads in the first threshold value SH4 (=50 dBμ) (step 104) and determines whether AVG>SH4 (=50 dBμ) holds (step 105). If AVG>SH4 holds, i.e., if the state of reception is good, the control circuit reduces the number N of oversamplings to 4 (step 106). Control then returns to step 102, whence processing is repeated.

If it is found at step S105 that AVG≦SH4 (=50 dBμ) holds, the control circuit refers to the ROM table 61a, reads in the second threshold value SH8 (=20 dBμ) (step 107) and determines whether AVG>SH8 (=20 dBμ) holds (step 108). If AVG >SH8 holds, i.e., if the reception field strength is 20 to 50 dBμ, meaning that the state of reception is ordinary or not that bad, the control circuit makes the number N of oversamplings equal to 8 (step 109). Control then returns to step 102, whence processing is repeated.

If it is found at step S108 that AVG≦SH8 (=20 dBμ) holds, namely that the state of reception is poor, the control circuit makes the number N of oversamplings equal to 16 (step 110). Control then returns to step 102, whence processing is repeated.

Thus, if the state of reception is good, the number of oversamplings is reduced and the operating speed of the matched filter is lowered, thereby making it possible to reduce power consumption. If the state of reception is poor, the number of oversamplings is enlarged to improve the precision with which despread timing is detected.

Though the foregoing relates to a case where the number of oversamplings is changed over among three stages in conformity with the reception field strength, an arrangement can be adopted in which the changeover is between two stages or among four or more stages.

(b) Second embodiment

Figure 5:
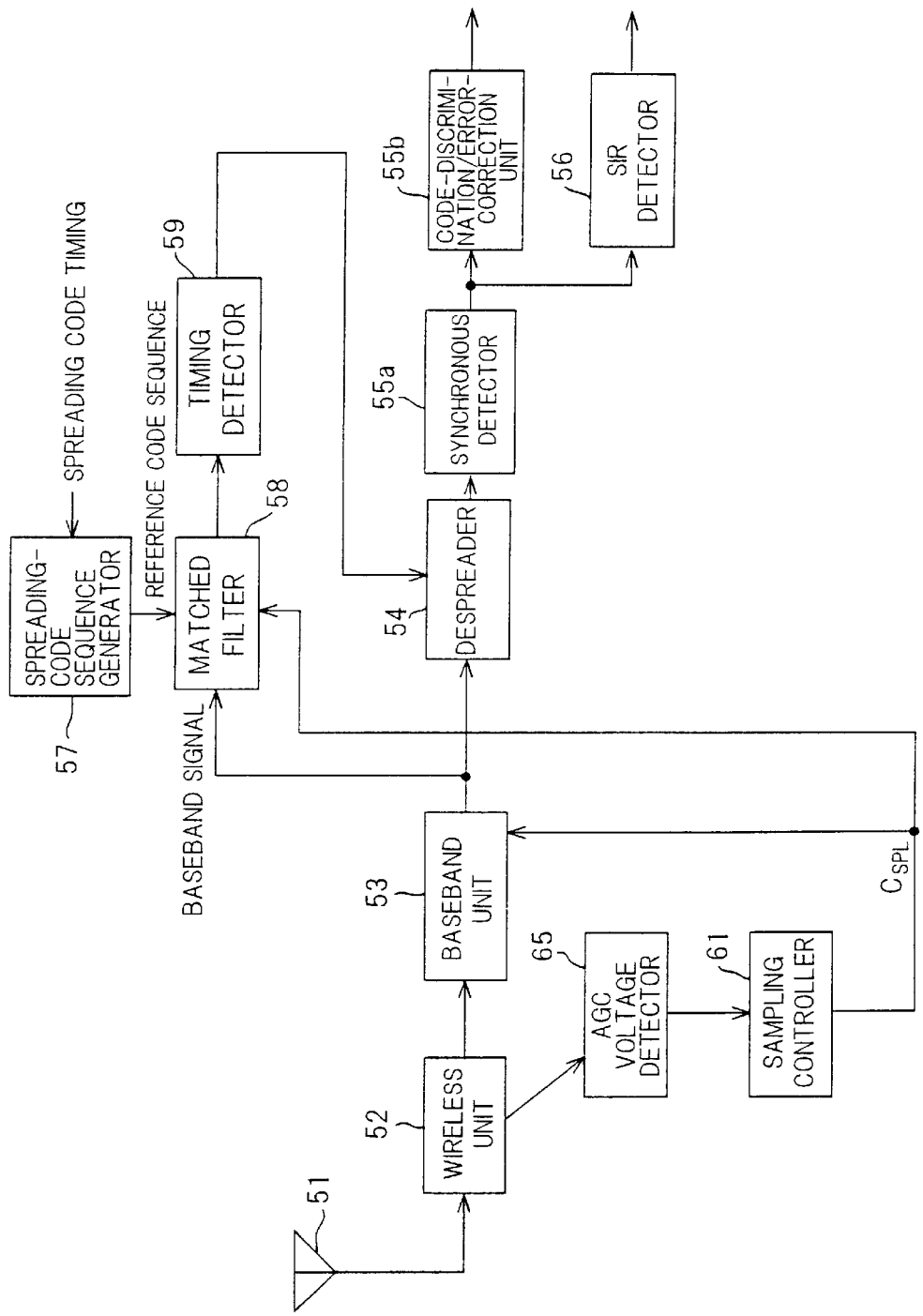
FIG. 5 is a block diagram showing a second embodiment of a CDMA receiver according to the present invention.

FIG. 5 is a block diagram showing a second embodiment of the present invention. Components in FIG. 5 identical with those of the first embodiment shown in FIG. 1 are designated by like reference characters. This embodiment differs from the first embodiment in that the RSSI detector 60 is deleted and is replaced by an AGC voltage detector 65 for detecting AGC (Automatic Gain Control) voltage, and in that the sampling controller 61 decides whether the state of reception is acceptable based not upon an RSSI value but upon the AGC voltage and controls the number of oversamplings of the matched filter 58 based upon the AGC voltage.

If the state of reception is good, the output of the IF amplifier 52d (see FIG. 2) increases and the AGC control voltage, which is the output of the AGC circuit 52e, decreases. Conversely, if the state of reception is not good, the output of the IF amplifier 52d decreases and the AGC control voltage increases. The AGC voltage detector 65 detects the AGC control voltage and inputs a signal indicative thereof to the sampling controller 61. If the AGC control voltage is low, the state of reception is good. The sampling controller 61 therefore reduces the number of oversamplings and lowers the operating speed of the matched filter 58. If the AGC control voltage is high, the state of reception is poor. The sampling controller 61 therefore increases the number of oversamplings and raises the operating speed of the matched filter 58. It should be noted that the number of oversamplings can be controlled over two or more stages based upon the value of the AGC control voltage.

The foregoing relates to a case where the gain of the AGC amplifier is controlled by the AGC control voltage to make the output constant. A step attenuator can be used instead of the AGC amplifier and the attenuation factor thereof can be controlled to provide a constant output. In such case the number of oversamplings would be controlled based upon the step-attenuator control voltage.

(c) Third embodiment

Figure 6:
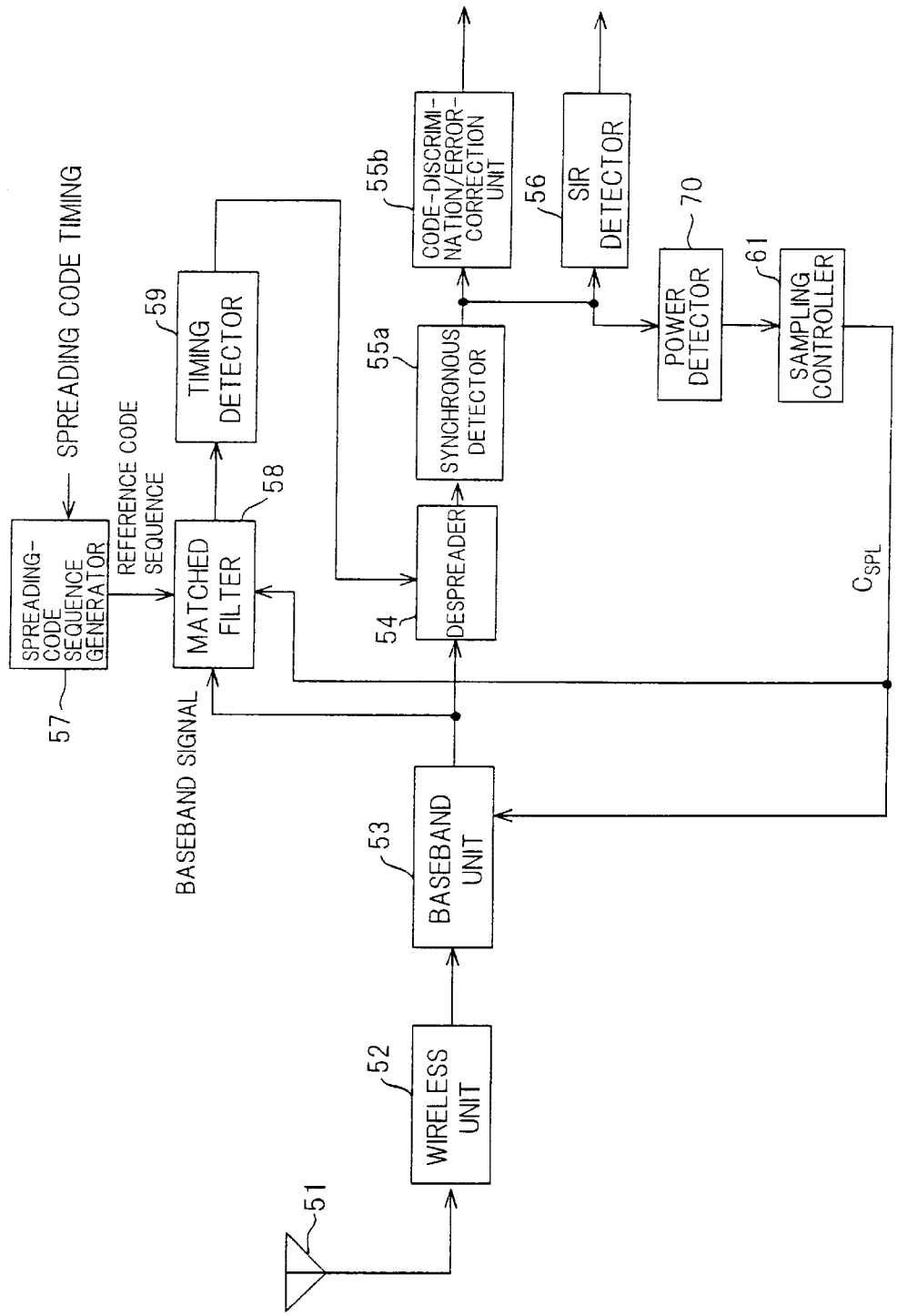
FIG. 6 is a block diagram showing a third embodiment of a CDMA receiver according to the present invention.

FIG. 6 is a block diagram showing a third embodiment of the present invention. Components in FIG. 6 identical with those of the first embodiment shown in FIG. 1 are designated by like reference characters. This embodiment differs from the first embodiment in that the RSSI detector 60 is deleted and is replaced by a power detector 70 for detecting the power of the output signal (despread signal) of the synchronous detector 55a, and in that the sampling controller 61 decides whether the state of reception is acceptable based upon the despread-signal power and changes over the number of oversamplings of the matched filter 58 based upon the power of the despread signal.

The power of the despread signal is high if the state of reception is good and is low if the state of reception is not good. The power detector 70 detects the power of the despread signal and inputs a signal indicative thereof to the sampling controller 61. The latter refers to the despread-signal power that enters from the power detector 70 and, if the power is high, regards this as being indicative of good reception, reduces the number of oversamplings and lowers the operating speed of the matched filter. If the power is low, on the other hand, the sampling controller 61 regards this as being indicative of poor reception, increases the number of oversamplings and raises the operating speed of the matched filter. It should be noted that the sampling controller 61 is capable of controlling the number of oversamplings over two or more stages based upon the value of the value of the despread-signal power.

In case of a single code in which a spread data sequence from a base station is received using one basestation code (spreading code), the power of the despread signal can be used as a control parameter as is. However, in case of a multicode in which spread data sequences from a plurality of base stations are received simultaneously using a plurality of base-station codes, as when soft handoff is performed, the minimum power is obtained from among the despread-signal powers obtained by despreading the spread data sequences from the respective base stations, and the number of oversamplings is decided based upon this minimum power.

Figure 7:
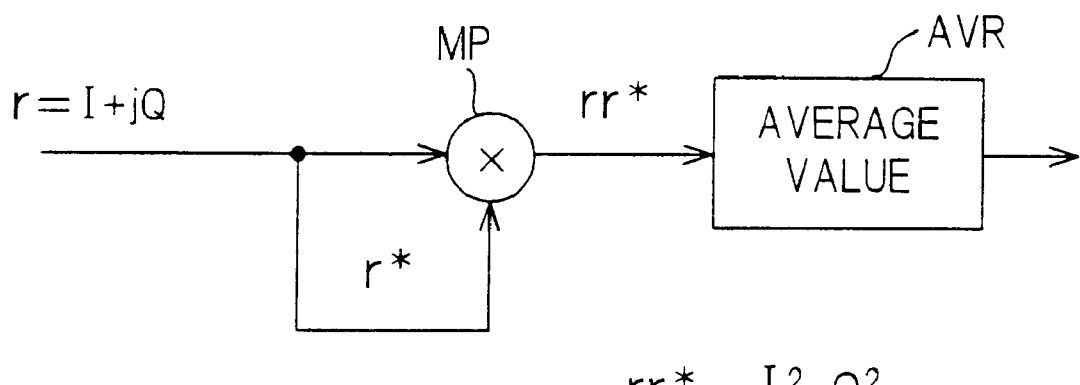
FIG. 7 is a diagram showing an arrangement for calculating power.

FIG. 7 is a diagram showing an arrangement for calculating the power of a despread signal. Here MP represents a multiplier and AVR stands for an average-value circuit. An I (in-phase) signal and a Q (quadrature) signal obtained by despreading and synchronous detection are related as follows if expressed in I–Q complex notation: $I+jQ=(I^2+Q^2)^{1/2} \exp(j\theta)$. Accordingly, the multiplier MP multiplies r (=I+jQ) and its complex conjugate r* (=I–jQ) together, after which the product is averaged by the average-value circuit AVR, the output of which is power $(I^2+Q^2)$.

(d) Fourth embodiment

Figure 8:
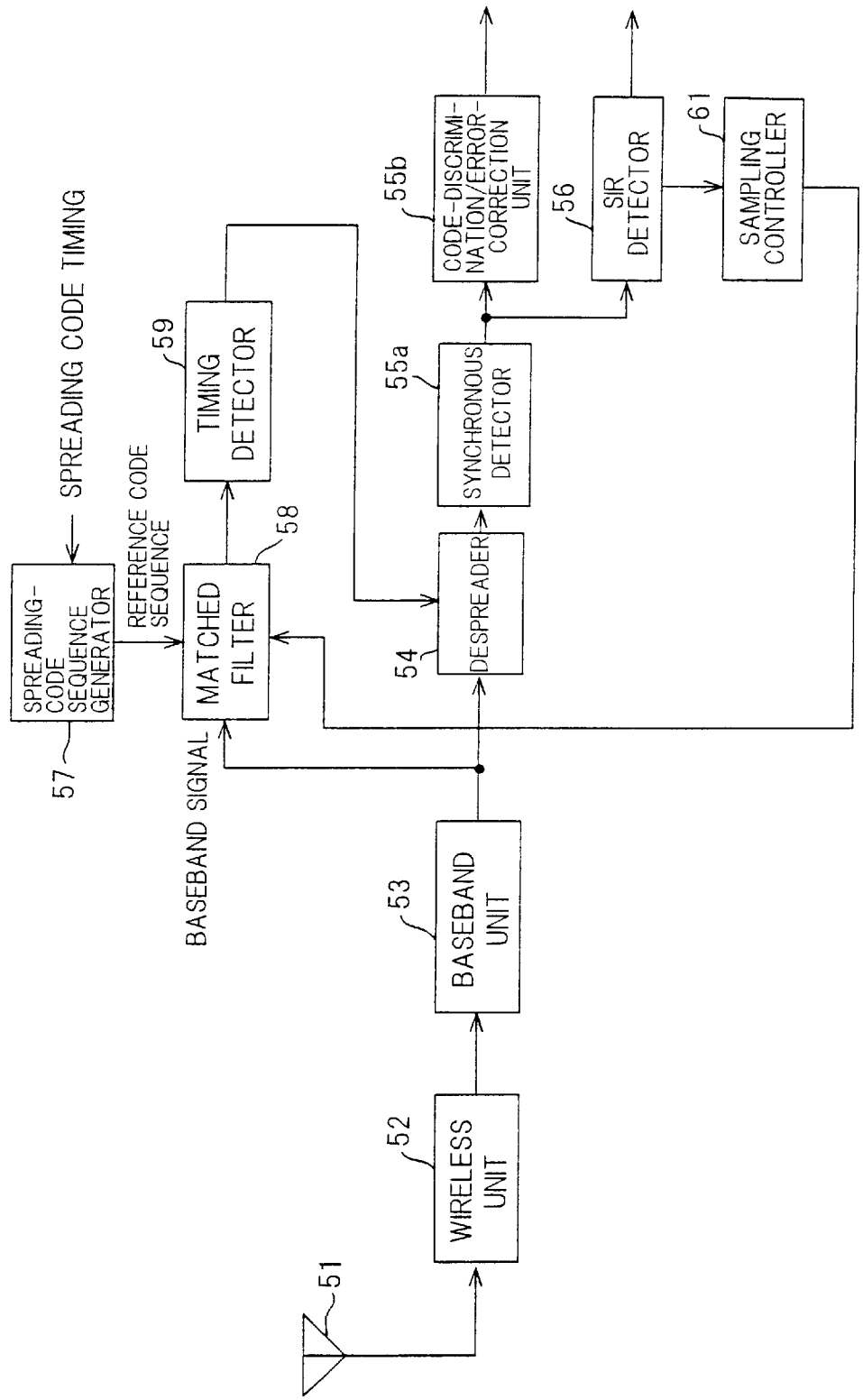
FIG. 8 is a block diagram showing a fourth embodiment of a CDMA receiver according to the present invention.

FIG. 8 is a block diagram showing a fourth embodiment of the present invention. Components in FIG. 8 identical with those of the first embodiment shown in FIG. 1 are designated by like reference characters. This embodiment differs from the first embodiment in that the RSSI detector 60 is deleted, and in that the sampling controller 61 decides whether the state of reception is acceptable based upon the SIR and changes over the number of oversamplings of the matched filter 58 based upon the SIR. According to the third embodiment, the state of reception is considered to be good if the power of the despread signal is high. However, there are instances where the amount of interference is great, and the state of reception cannot be considered good when such is the case. In other words, the state of reception is not necessarily good just because the power of the despread signal is large. On the other hand, if the state of reception is good, the SIR is always large and, if the state of reception is poor, the SIR is always small.

The SIR detector 56 detects the SIR and inputs a signal indicative thereof to the sampling controller 61. The latter judges the magnitude of the SIR input thereto from the SIR detector 56. If the SIR is large, this means that the state of reception is good and, hence, the sampling controller 61 reduces the number of oversamplings and lowers the operating speed of the matched filter. If the SIR is small, this means that the state of reception is poor and, hence, the sampling controller 61 increases the number of oversamplings and raises the operating speed of the matched filter. It should be noted that the sampling controller 61 is capable of controlling the number of oversamplings over two or more stages based upon the SIR.

Figure 9A:
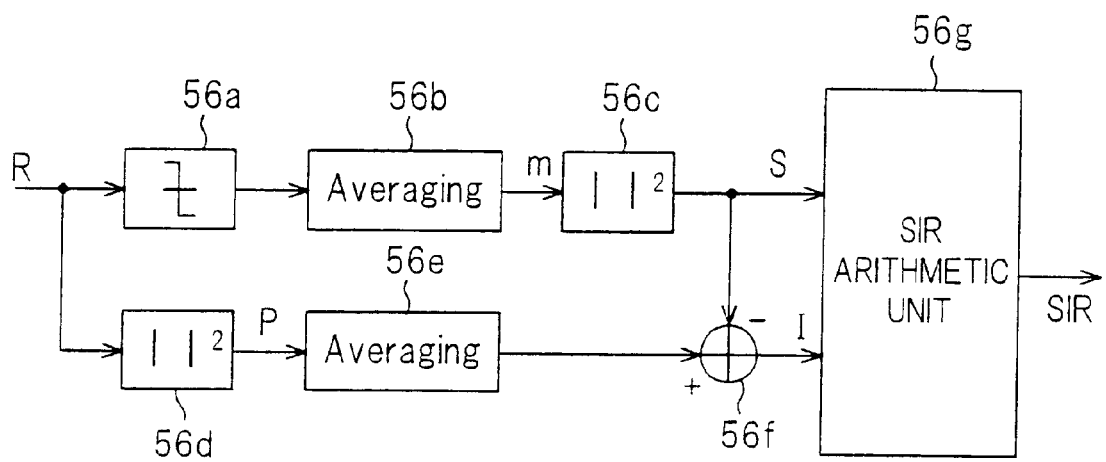
FIGS. 9A and 9B are diagrams useful in describing the construction and operation, respectively, of a SIR detector.
Figure 9B:
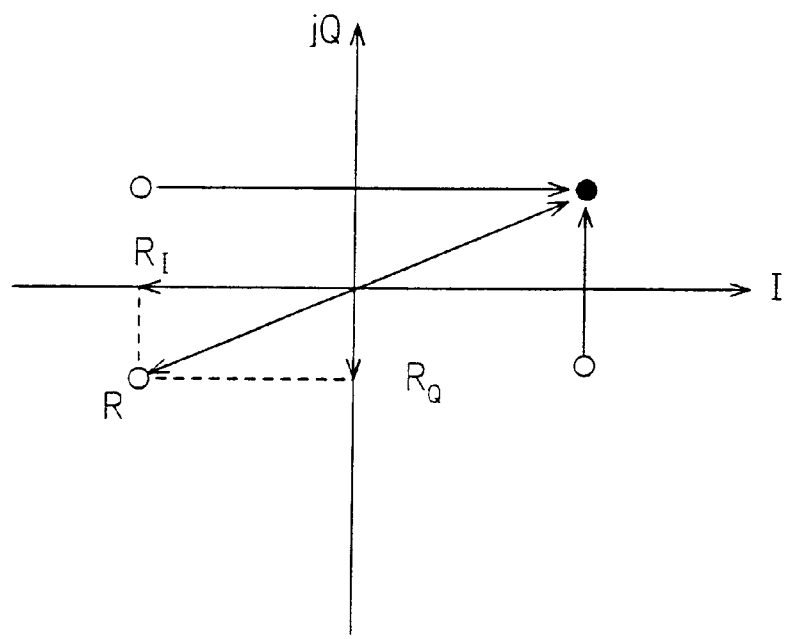

FIG. 9A is a diagram showing the construction of the SIR detector. As shown in FIG. 9A, the device includes a signal-point position altering unit 56a which, as shown in FIG. 9B, converts a position vector R (whose I and Q components are $R_I$ and $R_Q$, respectively) of a received signal point in the I–jQ complex plane to a point in the first quadrant of the plane. More specifically, the signal-point position altering unit 56a takes the absolute values of the I component (in-phase component) $R_I$ and Q component (quadrature component) $R_Q$ of the position vector R of the received signal point to convert this position vector to a signal in the first quadrant of the I–jQ complex plane. The SIR detector further includes an averaging arithmetic unit 56b for calculating the average value m of N symbols of the received-signal point position vector, a desired wave power arithmetic unit 56c for calculating $m^2$ (the power S of the desired signal) by squaring the I and Q components of the average value m and summing the squares, and a received-power calculation unit 56d for squaring the I and Q components $R_I$, $R_Q$ of the position vector R of the received signal point and summing the squares, i.e., for performing the following calculation:

$$P = R_I^2 + R_Q^2$$

to thereby calculate the received power P. The SIR detector further includes an average-value arithmetic unit 56e for calculating the average value of received power, a subtractor 56f for subtracting $m^2$ (the power S of the desired wave) from the average value of the received power, thereby outputting interference wave power I, and a SIR arithmetic unit 56g for calculating the SIR from the desired wave power S and interference wave power I in accordance with the equation $$SIR = S/I$$

(e) Fifth embodiment

Figure 10:
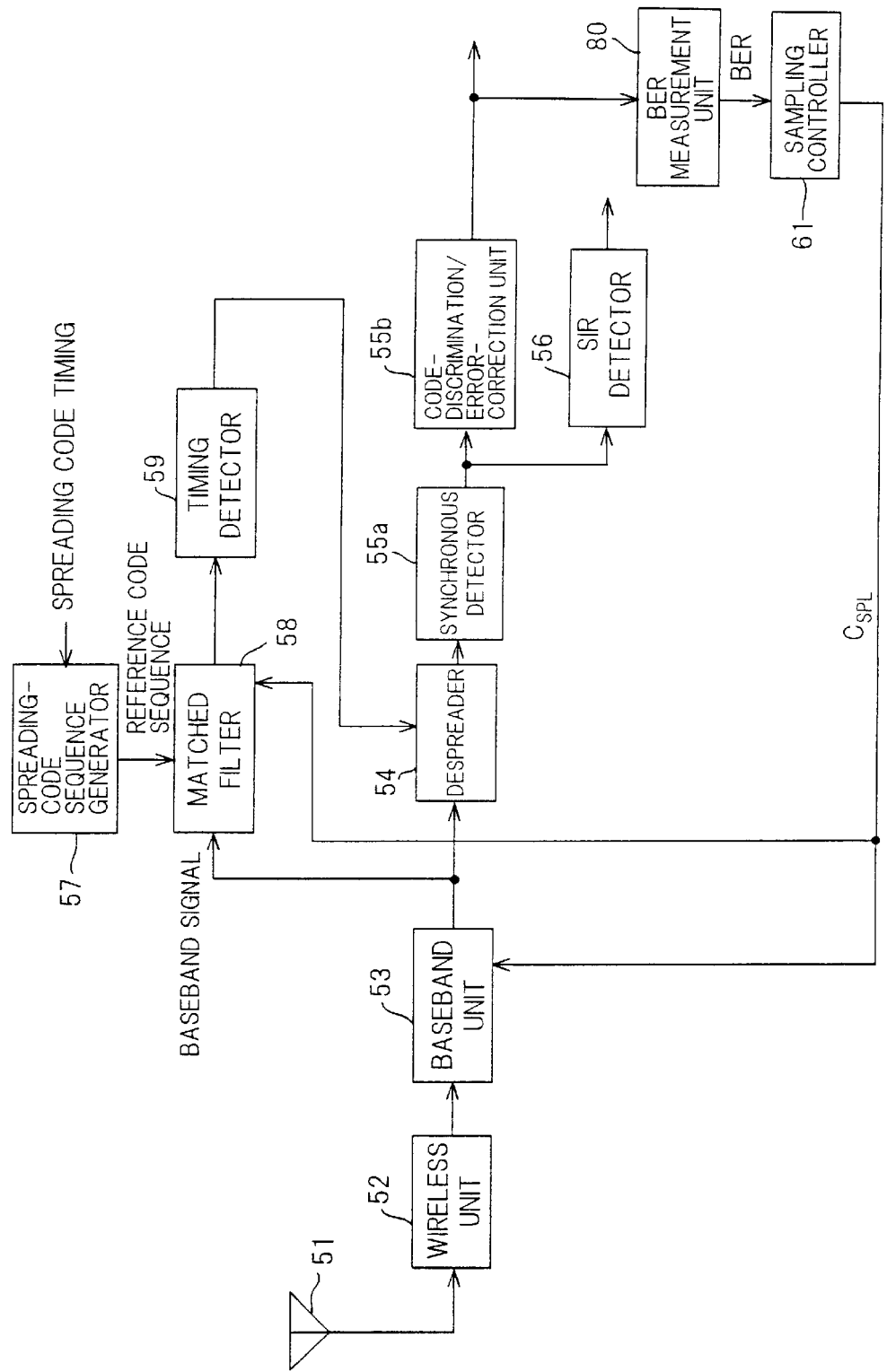
FIG. 10 is a block diagram showing a fifth embodiment of a CDMA receiver according to the present invention.

FIG. 10 is a block diagram showing a fifth embodiment of the present invention. Components in FIG. 10 identical with those of the first embodiment shown in FIG. 1 are designated by like reference characters. This embodiment differs from the first embodiment in that the RSSI detector 60 is deleted and is replaced by a BER measurement unit 80, and in that the sampling controller 61 decides whether the state of reception is acceptable based upon the BER (Bit Error Rate) and changes over the number of oversamplings of the matched filter 58 based upon the BER value.

The code-discrimination/error-correction unit 55b performs error detection and correction using an error correction code attached to the data in advance, outputs the identified code and inputs an error detection signal to the BER measurement unit 80 when an error is detected. The BER measurement unit 80 counts error detection signals and inputs the error detection count per fixed time interval to the sampling controller 61 as the BER. The sampling controller 61 compares the magnitude of the BER with a threshold value. If the BER is small, this means that the state of reception is good and, hence, the sampling controller 61 reduces the number of oversamplings and lowers the operating speed of the matched filter. If the BER is small, this means that the state of reception is poor and, hence, the sampling controller 61 increases the number of oversamplings and raises the operating speed of the matched filter. It should be noted that the sampling controller 61 is capable of controlling the number of oversamplings over two or more stages based upon the SIR.

Figure 11:
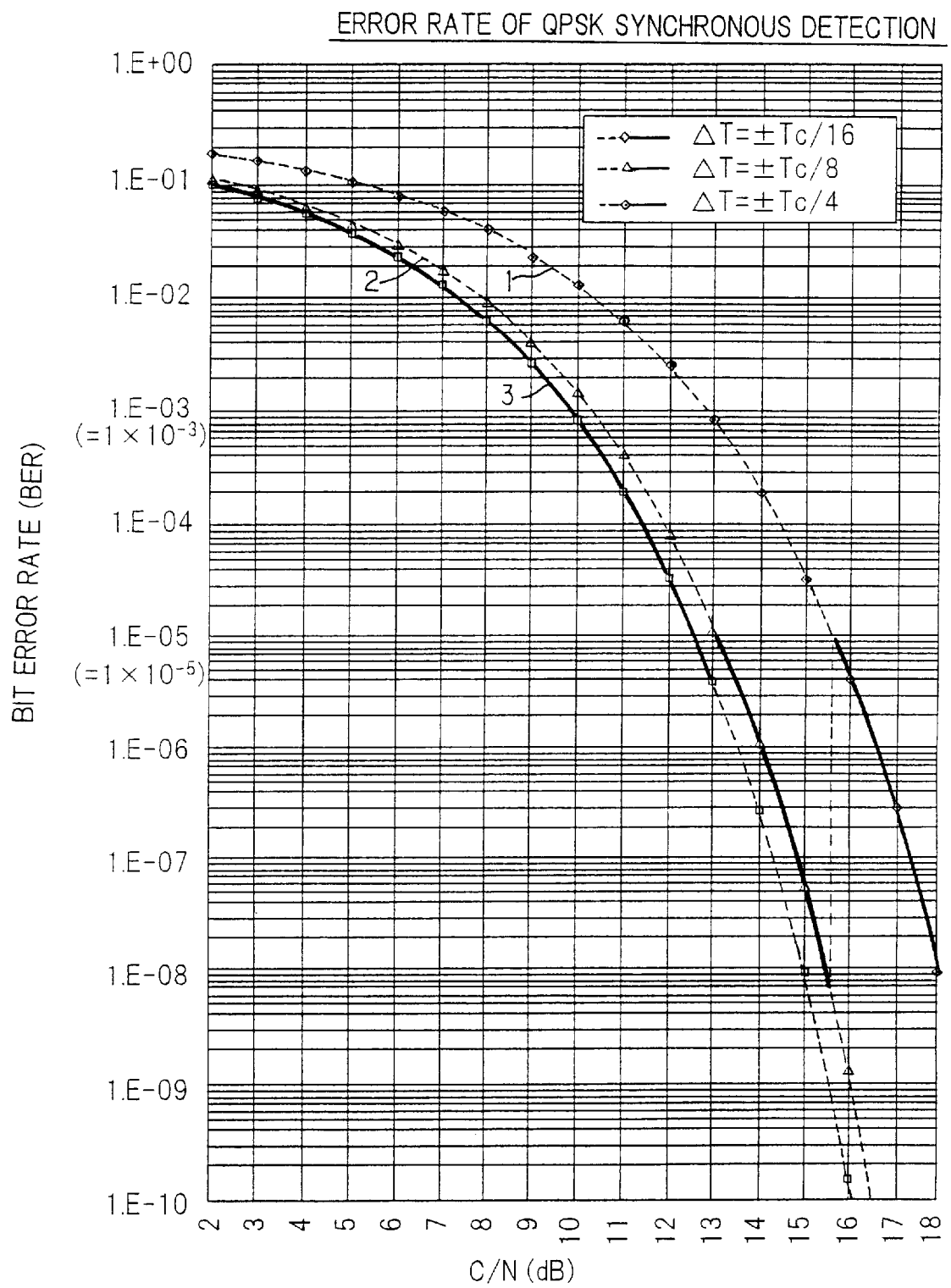
FIG. 11 is a graphical representation useful in describing control for changing over number of oversamplings according to the fifth embodiment.

FIG. 11 is a graphical representation useful in describing control for changing over number of oversamplings according to the fifth embodiment. Numeral 1 in FIG. 11 denotes a BER–C/N ratio characteristic at the time of four oversamplings (n=4), 2 a BER–C/N ratio characteristic at the time of eight oversamplings, and 3 a BER–C/N ratio characteristic at the time of 16 oversamplings. If the threshold value of BER which is the criterion for changing the number of samplings is $1 \times 10^{-5}$, then the number of oversamplings will undergo a transition as indicated by the bold lines in FIG. 11. That is, four oversampling is performed at C/N ratio>15.6 dB, eight sampling at 13 dB<C/N ratio<15.6 dB, and 16 oversampling at C/N ratio<13 dB.

The foregoing relates to a case where BER is measured by error detection based upon an ECC code. However, it is possible to insert a unique word such as a synchronous word or a known bit sequence into slots on the transmitting side in advance, measure the average bit error rate (BER) on the receiving side within a fixed time period such as a frame unit using this bit sequence, and control the number of oversamplings of the matched filter 58 in dependence upon the results of measurement.

(f) Sixth embodiment

Figure 12:
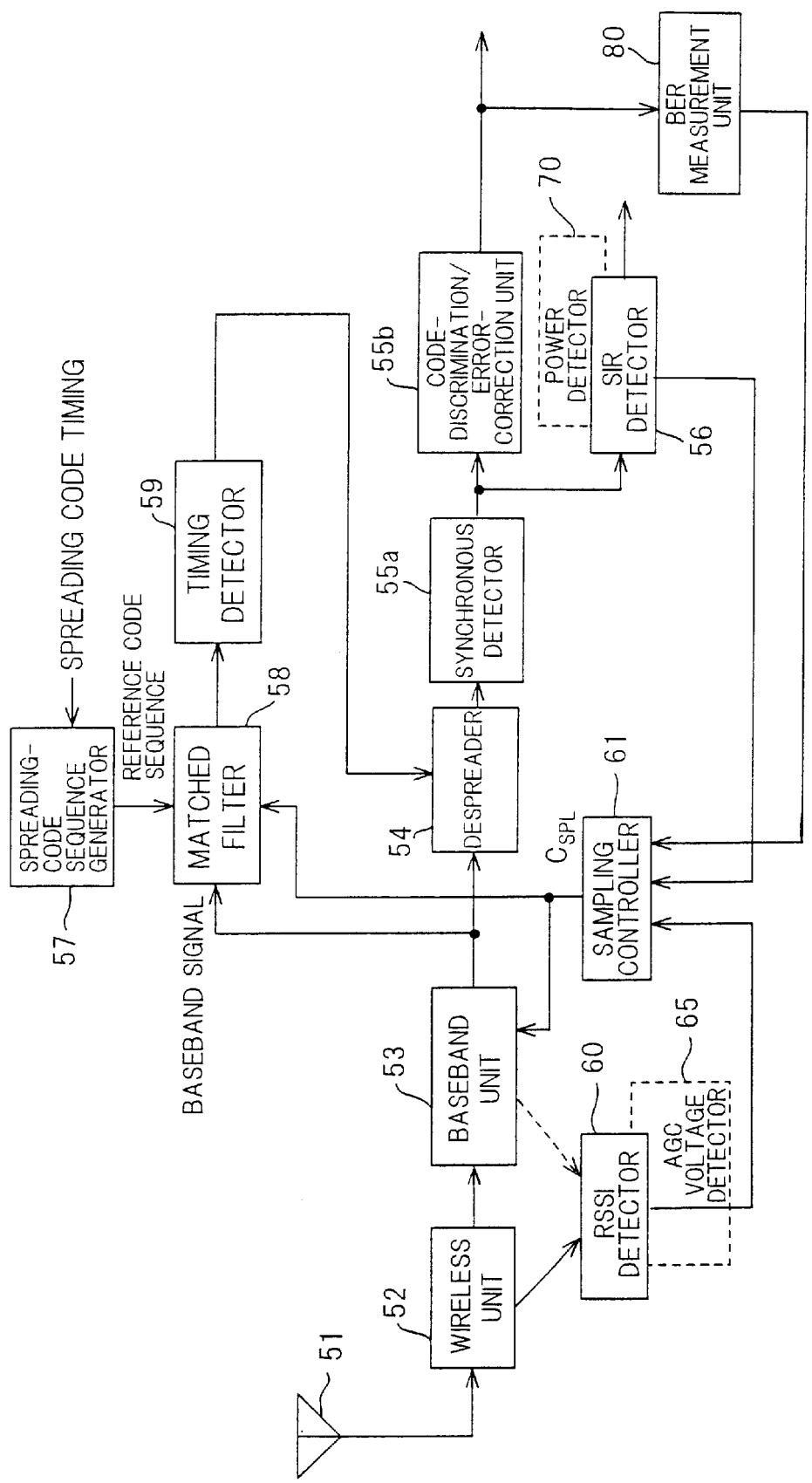
FIG. 12 is a block diagram showing a sixth embodiment of a CDMA receiver according to the present invention.
Figure 13:
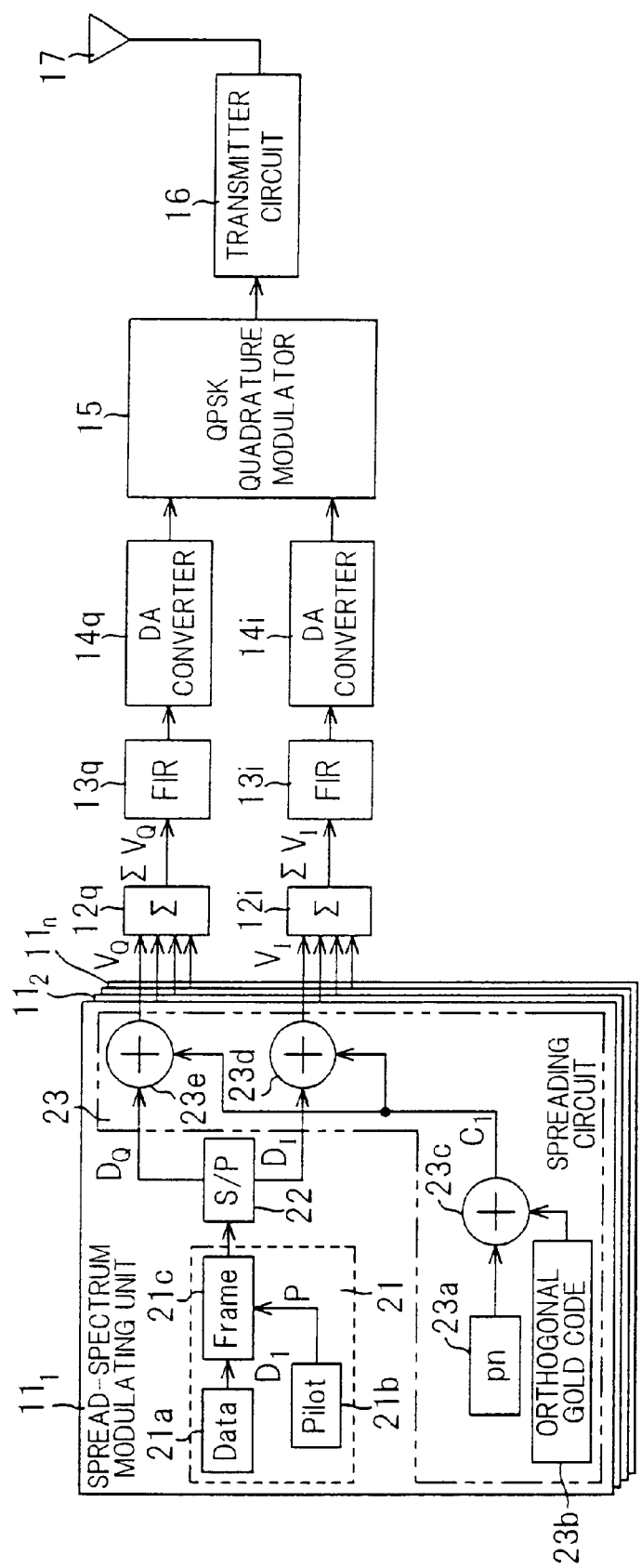
FIG. 13 is a diagram showing the construction of a CDMA transmitter according to the prior art.
Figure 14:
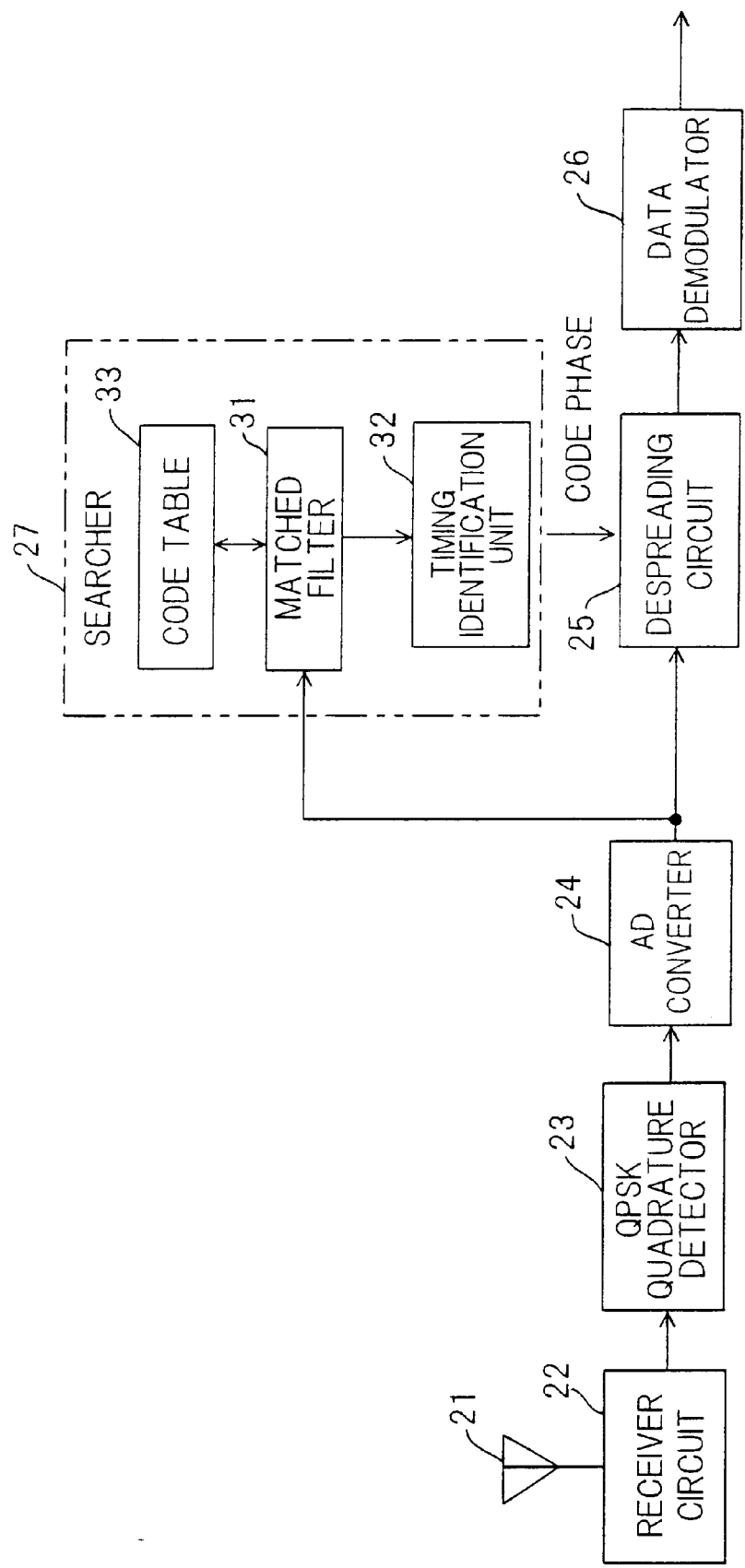
FIG. 14 is a block diagram showing the construction of a receiving device of a mobile station according to the prior art.
Figure 15:
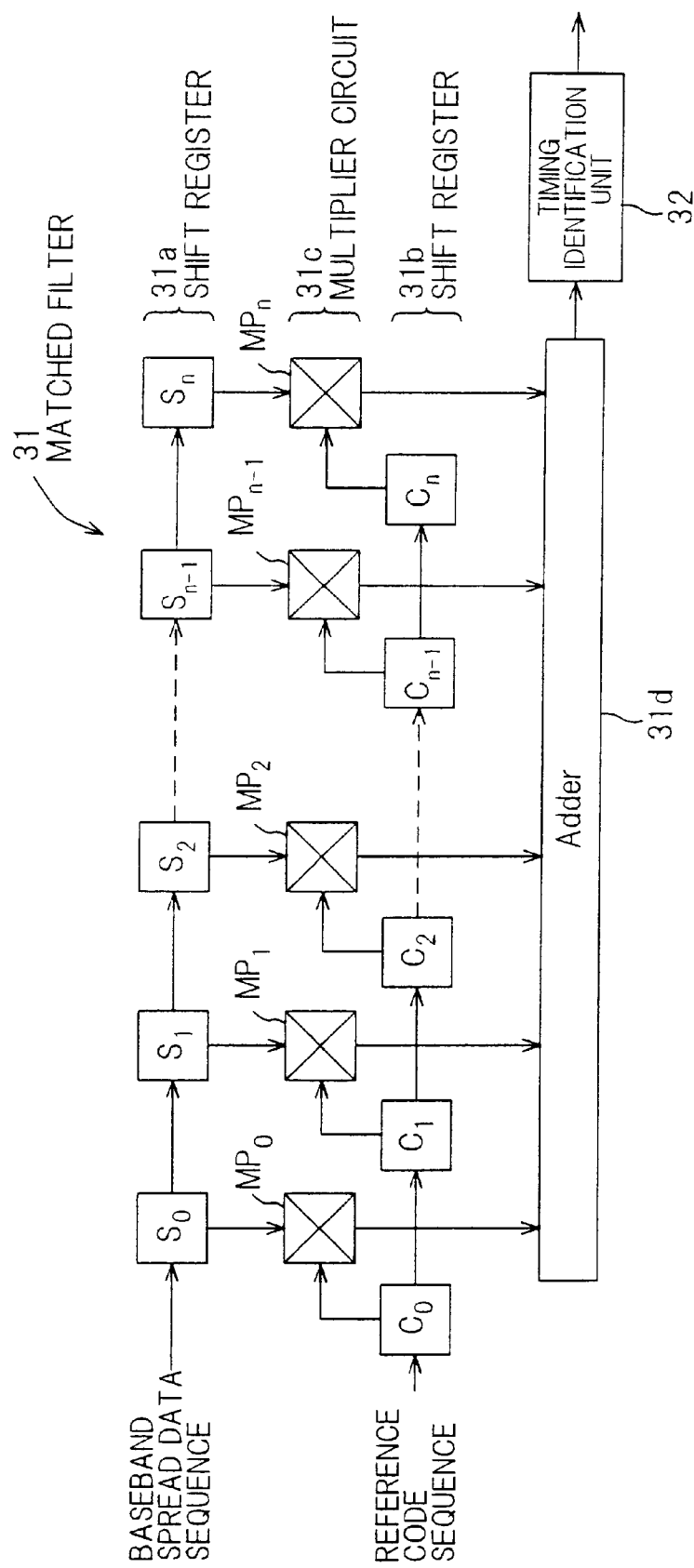
FIG. 15 is a diagram useful in describing the construction of a matched filter and a method of specifying despread timing according to the prior art.
Figure 16:
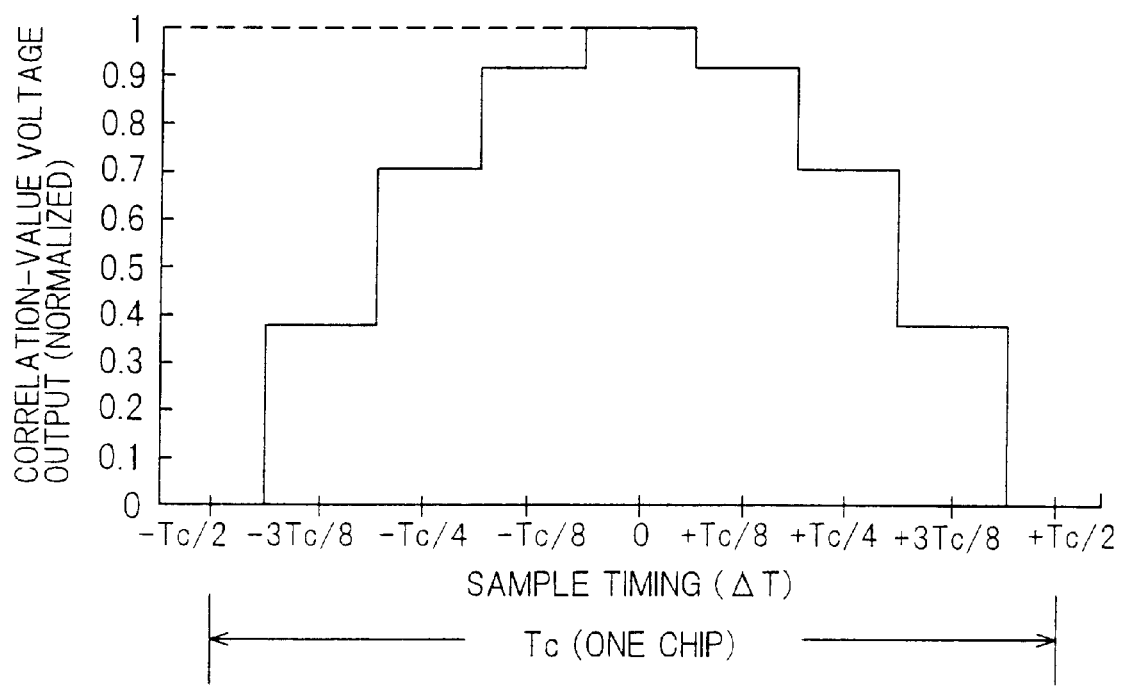
FIG. 16 is an explanatory view showing the relationship between number of oversamplings and correlation-value output according to the prior art.
Figure 17:
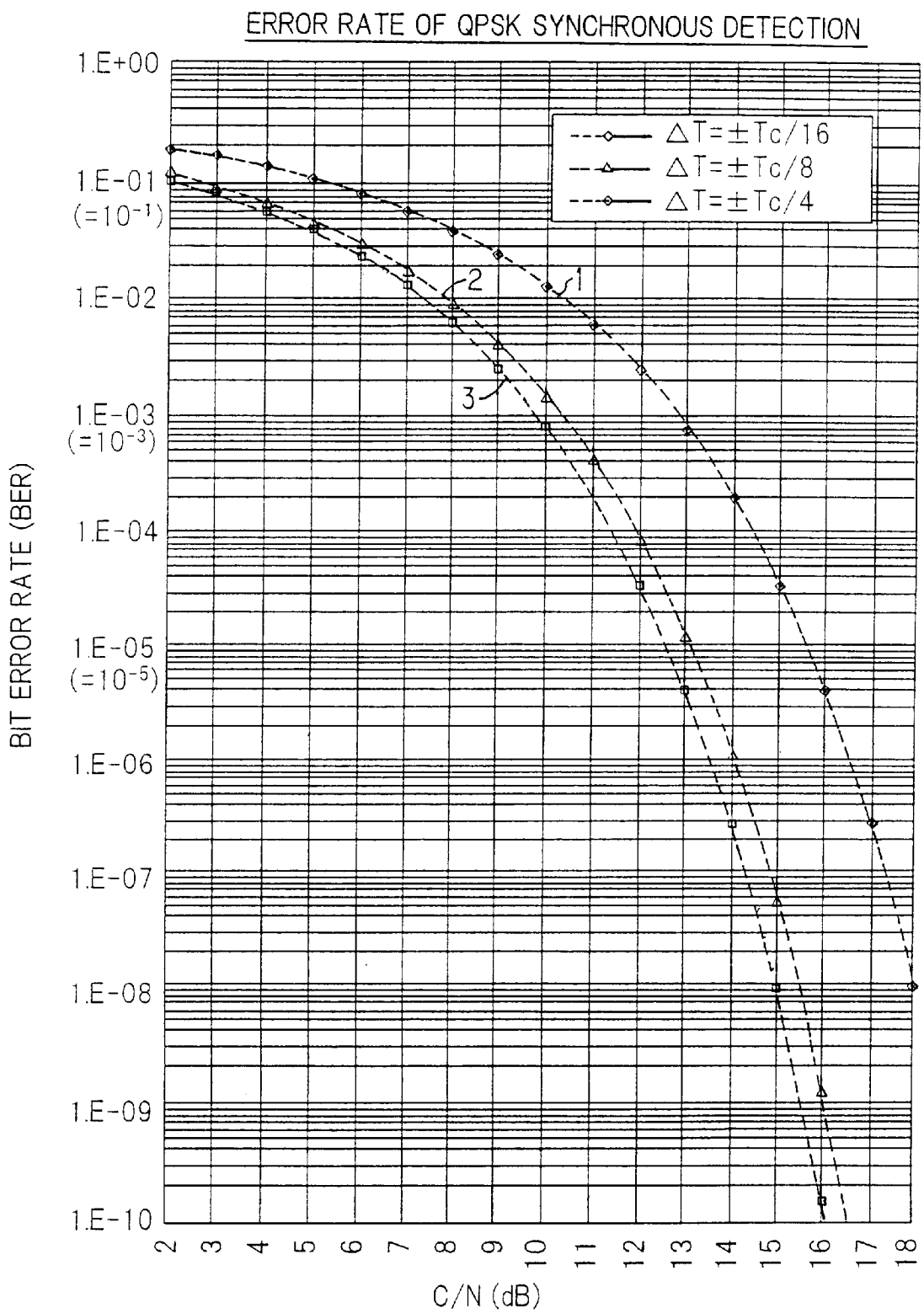
FIG. 17 is a diagram useful in describing a transition in number of oversamplings.

FIG. 12 is a block diagram illustrating the construction of a sixth embodiment of the present invention. This embodiment controls the number of oversamplings over a plurality of stages. Components in FIG. 12 identical with those of the first to fifth embodiments are designated by like reference characters. The sixth embodiment (1) controls the number of oversamplings of the matched filter 58 based upon the reception signal strength (RSSI value) or AGC control voltage value at an initial stage of control in which channel estimation is not possible, (2) performs control to optimize the number of oversamplings of the matched filter based upon the despread-signal power or SIR in the next stage, in which despreading becomes possible, and (3) finely adjusts the number of oversamplings of the matched filter based upon the BER value in the final stage, in which the BER is obtained.

More specifically, at the initial stage of control, in which channel estimation is not possible, the RSSI detector 60 or AGC voltage detector 65 detects the reception signal strength RSSI or AGC control voltage and inputs the detected value to the sampling controller 61. The latter controls the number of oversamplings of the matched filter 58 based upon the detected value.

Next, when the state in which despreading is possible is attained, the SIR detector 56 or despread-signal power detector 70 detects the SIR or despreadsignal power and inputs the detected value to the sampling controller 61. The latter controls the number of oversamplings of the matched filter 58 based upon the detected value.

Finally, when the state in which the BER is obtained is attained, the BER measurement unit 80 measures the BER and inputs the detected value to the sampling controller 61. The latter controls the number of oversamplings of the matched filter 58 based upon the BER value.

Thus, in accordance with the foregoing, the number of oversamplings of the matched filter can be controlled from the initial stage of control. As a result, the number of oversamplings can be controlled at high speed. Moreover, control for optimizing the number of oversamplings and control for shortening the time for convergence of the number of oversamplings becomes possible.

The foregoing relates to a case where the number of oversamplings is controlled in three stages. However, it is possible to adopt an arrangement in which any one of the three stages is eliminated to enable two-stage control, or in which the detection of each stage is subdivided to enable control of several stages.

Further, in order to speed up control-loop convergence and achieve optimization in the control of the number of oversamplings in each stage, it is possible to apply weighting to the control coefficients.

In accordance with the present invention as described above, the number of oversamplings is reduced and the operating speed of the matched filter is lowered if the state of reception is good. The operating speed of the matched filter is raised to improve the precision with which despread timing is detected only if the state of reception is poor. This makes it possible to reduce power consumption. Moreover, the precision with which despread timing is detected can be improved even in a case where the state of reception is not good.

Further, in accordance with the present invention, (1) a field-strength detector for detecting the electric field strength of a received signal, (2) an AGC controlvoltage detector for detecting the control voltage of an AGC circuit, (3) a power detector for detecting signal power after despreading is performed, (4) a SIR detector for detecting the SIR after despreading is performed, or (5) a bit error-rate detector for detecting the bit error rate of a received code can be used as the reception-state detector for detecting the state of reception. In accordance with the present invention, therefore, it is possible to employ the appropriate means to reduce power consumption and improve the precision with which despread timing is detected.

Further, in accordance with the present invention, sampling rate is controlled in dependence upon the reception field strength or AGC control voltage at the initial stage of control, then sampling rate is controlled in dependence upon despread-signal power or SIR, and sampling rate is controlled further based upon the bit error rate. As a result, the sampling rate of a matched filter can be controlled from an early stage at which channel estimation has not yet been made, such as at the time of initial start-up, the time needed for optimization of the sampling rate and for convergence of control can be shortened and power consumption of the CDMA receiver can be reduced.

As many apparently widely different embodiments of the present invention can be made without departing from the spirit and scope thereof, it is to be understood that the invention is not limited to the specific embodiments thereof except as defined in the appended claims.

What is claimed is:

1. A CDMA receiver for receiving a signal containing data that has been spread by a predetermined spreading code sequence, calculating a correlation value between a reference code sequence and a spread data sequence obtained by sampling the received signal at a predetermined sampling rate, and adopting, as despread start timing, the timing at which the correlation value is maximized, the CDMA receiver comprising:

a reception-state detector for detecting state of reception;

a sampling controller for deciding sampling rate in conformity with the state of reception;

a correlator for calculating a correlation between a reference code sequence and a spread data sequence, which is obtained by sampling a received signal at said sampling rate; and a timing detector for obtaining a timing at which the correlation value is maximized.

2. The receiver according to claim 1, wherein said sampling controller performs control in such a manner that the sampling rate is lowered if the state of reception is good.

3. The receiver according to claim 2, wherein said reception-state detector includes a reception field-strength detector for detecting electric field strength of a received signal; and said sampling controller decreases a number n of oversamplings when field strength is strong and increases the number n of oversamplings when the field strength is weak, where the number n of oversamplings is defined as being a number n when sampling frequency is n times a chip frequency of the spreading code sequence.

4. The receiver according to claim 2, wherein said reception-state detector has an AGC control voltage detector for detecting control voltage of an AGC circuit; and said sampling controller decreases a number n of oversamplings when the AGC control voltage is low and increases the number n of oversamplings when the AGC control voltage is high, where the number n of oversamplings is defined as being a number n when sampling frequency is n times a chip frequency of the spreading code sequence.

5. The receiver according to claim 2, wherein said reception-state detector has a power detector for detecting signal power after dispreading; and said sampling controller decreases a number n of oversamplings when the signal power is high and increases the number n of oversamplings when the signal power is low, where the number n of oversamplings is defined as being a number n when sampling frequency is n times a chip frequency of the spreading code sequence.

6. The receiver according to claim 2, wherein said reception-state detector has a SIR (Signal Interference Ratio) detector for detecting SIR after dispreading; and said sampling controller decreases a number n of oversamplings when the SIR is high and increases the number n of oversamplings when the SIR is low, where the number of oversamplings n is defined as being a number n when sampling frequency is n times a chip frequency of the spreading code sequence.

7. The receiver according to claim 2, wherein said reception-state detector has a bit error-rate detector for detecting bit error rate of a received code; and said sampling controller decreases a number n of oversamplings when the bit error rate is low and increases the number n of oversamplings when the bit error rate is high, where the number n of oversamplings is defined as being a number n when sampling frequency is n times a chip frequency of the spreading code sequence.

8. The receiver according to claim 1, wherein said sampling controller controls the sampling rate in dependence upon reception field strength or AGC control voltage at an initial stage of control, and then controls the sampling rate in dependence upon signal power or SIR after despreading.

9. The receiver according to claim 1, wherein said sampling controller controls the sampling rate in dependence upon reception field strength or AGC control voltage at an initial stage of control, then controls the sampling rate in dependence upon signal power or SIR after despreading, and then controls the sampling rate in dependence upon bit error rate.

* * * * *